Sept. 29, 1931.    F. LAWACZECK    1,824,960
METALLURGICAL PROCESS AND APPARATUS
Original Filed March 16, 1927
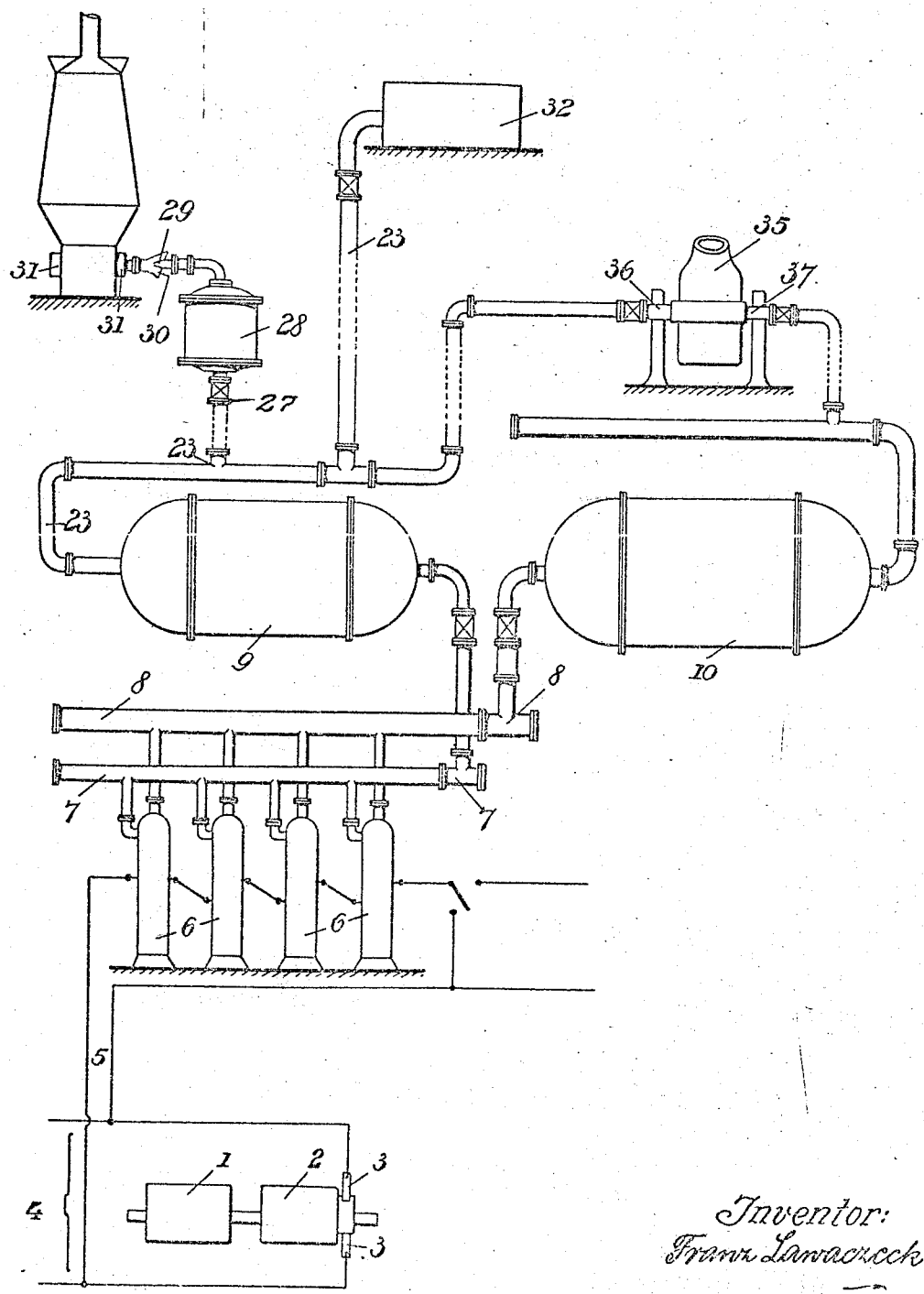
Inventor:
Franz Lawaczeck
by ...
Atty.

Patented Sept. 29, 1931

1,824,960

UNITED STATES PATENT OFFICE

FRANZ LAWACZECK, OF MUNICH, GERMANY, ASSIGNOR TO FIRM LAWACZECK GESELLSCHAFT MIT BESCHRANKTER HAFTUNG, OF BERLIN, GERMANY

METALLURGICAL PROCESS AND APPARATUS

Original application filed March 16, 1927, Serial No. 175,855, and in Germany December 17, 1925. Divided and this application filed December 22, 1927. Serial No. 241,946.

My invention refers to metallurgical processes and apparatus, and more especially to means whereby such processes and apparatus can be operated in a more economical way, making use of cheap forms of energy such as are available in power plants serving in the first line for the production of electric energy for illumination and other purposes.

Hitherto the suggestion of feeding metallurgical furnaces with oxygen and hydrogen or with air enriched with oxygen could not be carried into practice in view of the impossibility of producing hydrogen and more especially oxygen in a sufficiently economical manner. Moreover the mode of production of these gases could not be adapted to the particular conditions of operation prevailing in metallurgical furnaces. If oxygen and hydrogen are produced electrolytically the electric current required for this purpose may be produced with the aid of that part of the fuel, which is saved in the furnace itself, if the air of combustion is replaced by oxygen and hydrogen. This economy would be attained if the excess current and more especially the night current produced in power stations were applied to the electrolytical decomposition of water. However, metallurgical furnaces such as blast furnaces are known to require permanent operation. In contradistinction thereto the excess current produced in power plants is only available intermittently and therefore requires the storing of the intermittently produced gases for subsequent utilization.

Hitherto however it has proved impossible to store such quantities of hydrogen and oxygen as would suffice to fill up the intervals between the periods of direct gas production in the power plant.

This difficulty can be overcome if oxygen and hydrogen are developed by electrolysis under pressure and are conveyed directly to the place of consumption through a pipe line, thus dispensing with storage. If water is decomposed electrolytically in pressure resistive cells, the gases are recovered under very high pressures, up to 1000 atms. and above, without requiring any surplus of energy. It is now possible to transport great quantities of these gases over long distances in narrow and therefore inexpensive pipes, which at the same time form an accumulator which allows adapting the intermittent production of the gases to the constant operation of metallurgical furnaces. Therefore separate accumulators or storers may be dispensed with altogether, if the gases are produced and supplied through pipe lines under very high pressure. At the same time the high pressure offers an inexpensive means for conducting the gases over long distances in case that the place where the electrolytical process is carried through should not be situated in the vicinity of the furnaces. Preferably the moisture which may be present in the gases produced by electrolysis should be removed before the gas enters the long distance pipe. This removal of moisture is preferably effected by a well known freezing-out operation.

In the drawings affixed to this specification and forming part thereof, a plant in which my invention can be performed is illustrated diagrammatically, it being understood that the plant shown is only an example for the many possibilities of reducing my invention to practice.

Referring now to the drawings, 1 is an engine of any suitable type, for instance a hydraulic or steam turbine which operates a direct-current generator 2. 3, 3 are the terminals or bus of the generator to which the direct-current system 4 is connected. The current not required in the system is conducted to an electrolytic high pressure battery 6 by means of wires 5 connected in parallel to the system 4. The electrodes of the several electrolyzer units may be connected in series for facilitating their connection to normal system voltage, for instance by the means described in my U. S. Patent No. 1,600,478, and the several units 6 may also be connected in series. 7 and 8 are headers for the gases generated in the units 6 from which they are separately connected under pressure, and 9 and 10 are storage reservoirs connected to the headers for oxygen and hydrogen, respectively.

The excess pressure obtained without appreciable added cost is utilized in a particularly convenient and simple manner where only a small final pressure is required. For instance the oxygen from the reservoir 9 may be supplied by means of a high pressure long distance line 23 to one or more injectors 29 of a blast furnace, thus dispensing with the huge blowers for blast furnaces. As illustrated, one of the oxygen pipe lines 23 is connected with a tank 28, preferably over a reducing valve 27 and from this tank the oxygen flows to the injector or injectors 29 at reduced pressure, drawing in large quantities of atmospheric air through a nozzle 30 and ejecting the mixture of air and oxygen under a suitable final pressure into the tuyères 31 of the blast furnace. In this manner the energy stored in the small quantity of oxygen supplied to the injector or injectors 29 under its comparatively high pressure is supplied to a comparatively large quantity of gas, in the present instance air, of lower pressure in a simple manner and by apparatus comprising no movable parts. Consequently it is possible with a very small quantity of oxygen under high pressure to exert a low final pressure, as required for a blast furnace, on a large quantity of air, whereby the entire blower system at present required is eliminated.

Another important fact in the operation of a blast furnace is that the mixture supplied to its tuyères is richer in oxygen than atmospheric air and consequently will burn at a higher temperature and effect a corresponding saving in the amount of coke required. Another fact which also makes for economy is that the percentage of nitrogen in the mixture is reduced in proportion and these facts also lead to a reduction of the time required for a charge to flow through the furnace.

In blast furnaces and other metallurgical plants the oxygen from the excess energy may also be used in pure condition, that is, without mixing it with air. If this is done, the nitrogen of the air which must be heated up, but does not perform any useful function, is eliminated altogether and therefore the saving of coke in the blast furnace is so high that the electrical energy required for generating the oxygen might be produced with this coke and therefore the advantages obtained by the use of oxygen are obtained free of cost. By way of example I have illustrated at 32 a Siemens-Martin furnace to which oxygen under pressure is supplied by one of the pipe lines 23.

Obviously in any plant not only the temperature is increased due to the elimination of the inert nitrogen, but the efficiency of the plant is increased also, and for a given output the plant will therefore be smaller and its initial cost and interests will be reduced per unit of weight of materials treated in the plant.

The hydrogen may also be used for many purposes, and particularly in metallurgical processes, if water power, but no coal is available. In this case the hydrogen is used for initiating or completing metallurgical processes. A very economical solution is found in the disassociation of water by hydraulic power current, as described, the generated high-pressure hydrogen being conducted to the ore, where, after having generated the melting temperature in an oxy-hydrogen flame, the hydrogen combines with the oxygen of the ore, forming steam and reducing the ore. The hydrogen reduction involves the further advantage that the iron can be refined to any desired kind of steel in the same reducing furnace, as the blast furnace is, so to speak, replaced by the Bessemer converter. As shown at 35, the ore in the converter is melted together with the additions by means of an oxy-hydrogen flame which is supplied from the pipes 36 and 37, and the slag is removed and thereafter hydrogen in excess is blown into the melt from the pipe 37 until the reduction has been completed. If any impurities, such as phosphorus, sulphur, carbon and other substances, are contained in the melt, oxygen is blown into it, and finally silicon, carbon-containing substances and other admixtures are added as required for obtaining any desired steel alloy.

I wish it to be understood that I do not desire to be limited to the exact details of construction shown and described for obvious modifications will occur to a person skilled in the art.

I claim:—

1. The method of operating electric power plants comprising utilizing the excess energy resulting in said plant for the electrolytic generation of hydrogen and oxygen under pressure, and causing said oxygen to draw from the atmosphere the air required for operating a blast furnace, at the same time imparting to it the pressure required for operating said furnace.

2. The method of operating electric power plants comprising utilizing the excess energy resulting in said plant for the electrolytic generation of hydrogen and oxygen under pressure, and causing said oxygen to draw from the atmosphere the air required for operating a forced draught furnace, at the same time imparting to it the pressure required for operating said furnace.

3. An electric power plant comprising an electrolyzer for the electrolytic generation of hydrogen and oxygen from the excess energy resulting in said plant, a narrow high-pressure pipe line in which the oxygen is shipped, and a blast furnace comprising an injector supplied with oxygen from said pipe line and adapted to eject a mixture of air and oxygen from the tuyères of said blast furnace.

In testimony whereof I affix my signature.

FRANZ LAWACZECK.